May 20, 1930.  C. J. RHODIN  1,759,370
COMBINATION RADIUS ROD AND TORQUE ARM
Filed Oct. 20, 1928
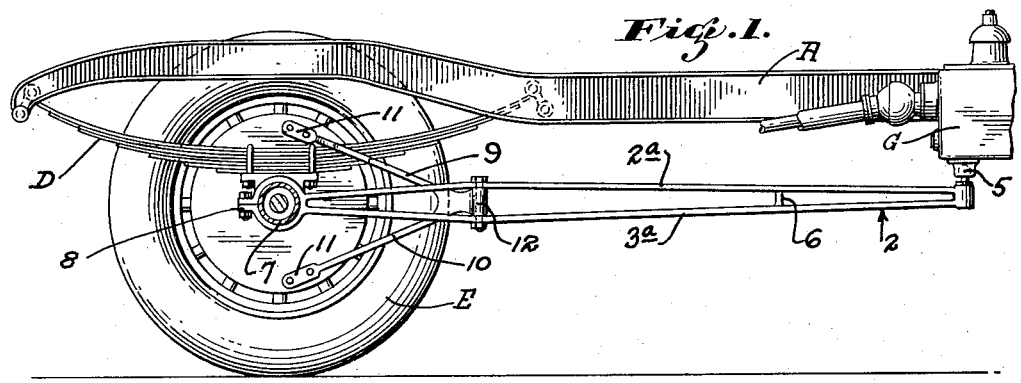
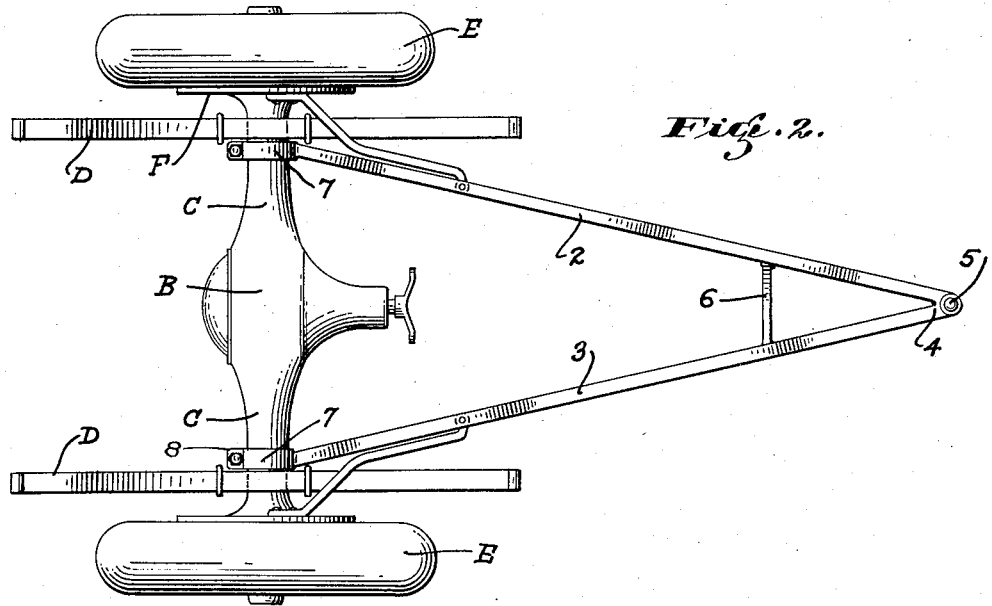
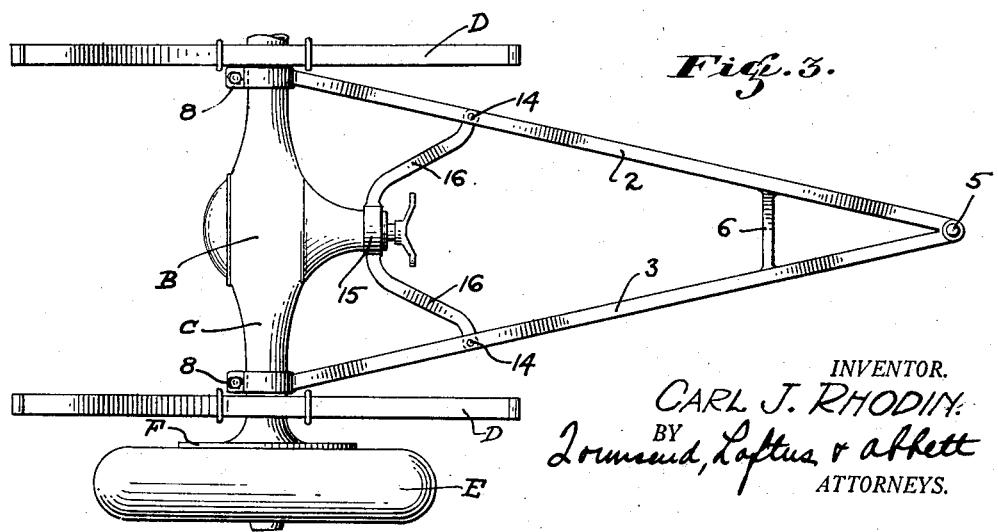
INVENTOR.
CARL J. RHODIN.
BY
Townsend, Loftus & Abbett
ATTORNEYS.

Patented May 20, 1930

1,759,370

UNITED STATES PATENT OFFICE

CARL J. RHODIN, OF OAKLAND, CALIFORNIA

COMBINATION RADIUS ROD AND TORQUE ARM

Application filed October 20, 1928. Serial No. 313,657.

This invention relates to a combination radius rod and torque arm for motor vehicles, and the like.

The object of the present invention is to generally improve and simplify the construction and operation of radius rods and torque arms as used on motor vehicles and the like; to provide a pair of torque arms which are adapted to be secured at their outer ends to the brake flanges of a vehicle, and at their inner ends to a radius rod at a point intermediate the ends of the radius rod; and further to provide a radius rod which will not only function to maintain the axle housing or axles in their proper transverse position with relation to the vehicle frame, but also to function as an anchor for the torque arms and to that extent, also function as an auxiliary torque arm.

The combination radius rod and torque arm is shown by way of illustration in the accompanying drawings in which:

Fig. 1 is a side elevation of the rear end of a motor driven vehicle, said view being partially in section and said view showing the position of the radius rod and torque arm, Fig. 2 is a plan view of Fig. 1, showing the frame and the transmission case removed, Fig. 3 is a view similar to Fig. 2 but showing a modified form of the torque arm.

Referring to the drawings in detail, particularly Figs. 1 and 2, A indicates the main frame of a motor driven vehicle, B the differential housing, C the axle housing, D the springs interposed between the axle housing and the main frame, and E the rear driving wheels. The drawings also illustrate the brake flanges F which are secured to the axle housing in the usual manner; and the rear portion of the transmission case is also illustrated, as at G.

The combination radius rod and torque arm forming the subject matter of the present application is also illustrated in Figs. 1 and 2. The radius rod is V-shaped. It consists of two arms, indicated at 2 and 3. These arms are joined at the inner end, as indicated at 4, and they are provided with a ball or socket connection 5, which in this instance is attached to the transmission case. The arms 2 and 3 of the radius rod may be constructed in any suitable manner, but to insure light weight and rigidity a truss beam structure is preferably employed as shown in side elevation in Fig. 1. That is, each of the arms 2 and 3 consist of upper and lower bars 2ª and 3ª which are braced both vertically and transversely, as indicated at 6. The outer ends of the arms 2 and 3 are secured to the axle housing as indicated at 7, in any suitable manner, for instance by a clamp connection 8 or the like. The connections 7 serve only one function, to wit, that of maintaining the axle housing in the proper transverse position with relation to the main frame. The connections 7 do not take any of the torque stress, hence a comparatively light metal may be employed. The torque arms employed are preferably constructed of comparatively light metal, as they assume a bracket form which may be pressed from sheet metal or the like. Each torque arm is fork shaped, and consists of two arms such as indicated at 9 and 10. These arms are secured as at 11 to the inner face of the brake flange F, and their opposite ends are joined and secured to the adjacent radius rods as indicated at 12. Torque stresses are thus taken up by the arms 9 and 10 as these are anchored at one end to the brake flanges and at their opposite ends to the radius rods, and torque stresses will be transmitted thereto. Hence, they will function not only as radius rods but also as auxiliary torque arms.

It should here be noted that the anchor connection between the torque arms and the radius rods is made at a point intermediate the ends of the radius rods. This is exceedingly important as the torque stresses transmitted to the radius rods are, in this manner, distributed to both ends thereof. That is, part of the torque stress is transmitted to the outer connection 7, and partly to the inner connection indicated at 5. This even distribution of stresses permits a comparatively light weight structure to be employed. The torque stresses in the arms 9 and 10 of the respective torque arms, will alternately be taken up in tension and compression. When the brakes are applied, one arm will be in tension and the opposite arm in compression, and when the wheels are being driven the stresses will be reversed.

A modified form of the structure is illustrated in Fig. 3. In this instance the radius rods are identical in construction to those shown in Figs. 1 and 2. But the position and shape of the torque arms are different. That is, the outer ends of the torque arms are attached to the radius rods in the same manner as previously described and at the point indicated at 14, but the inner ends of the torque arms are in this instance secured to the forward end of the differential housing, as shown at 15. Any torque stress transmitted to the differential housing and the axle housing, whether by driving or brake action, is thus completely absorbed by the connection 15 and transmitted through the torque arms 16 to the radius rods as previously described.

The preferred and modified structure of the combination radius rod and torque arm is exceedingly simple and it is so designed that it may be applied to practically any type of motor vehicle, as it does not interfere with the propeller shaft, nor with the brake rods or other mechanism employed.

While certain features of the present invention are more or less specifically described, I wish it understood that various changes may be resorted to within the scope of the appended claims, similarly that the materials and finishes of the several parts employed may be such as the manufacturer may decide or varying conditions or uses may demand, and that the assembly of the parts may be varied, modified or combined to meet the requirements of manufacturing, simplified construction, rigidity and economy.

Having thus described my invention, what I claim and desire to secure by Letters Patent is:

1. The combination with the axle of a vehicle of a radius rod attached at one end to the vehicle and at the opposite end to the axle, and a torque arm rigidly secured at one end to the axle and at the opposite end to the radius rod at a point intermediate the ends of the radius rod and disposed on a sufficient angle with relation to the longitudinal axis of the radius rod to absorb torsional movement of the axle either in tension or compression.

2. The combination with the axle of a vehicle and the frame of a vehicle of a radius rod; a universal connection between one end of the radius rod and the vehicle frame; a pivotal connection between the opposite end of the radius rod and the vehicle axle; a torque arm rigidly secured at one end to the axle; and a rigid connection between the opposite end of the torque arm and the radius rod.

3. The combination with the axle of a vehicle and the vehicle frame of a radius rod; said radius rod being V-shaped, a universal connection between the vehicle frame and the apex of the V-shaped rod; a connection between the opposite ends of the radius rod and the vehicle axle; a pair of torque arms; said arms being rigidly secured at their outer ends to the vehicle axle; and a rigid connection between the inner ends of the torque arms and the radius rods, said last named connection being made at a point intermediate the ends of the radius rod.

4. The combination with the axle of a vehicle and the vehicle frame of a horizontally disposed V-shaped radius rod interposed between the frame and the axle to maintain the axle in a transverse operating position with relation to the frame; a pair of brake flanges on the axle, one at each end thereof; a pair of V-shaped torque arms vertically disposed with relation to the radius rod; a rigid connection between the apex ends of the torque arms and the radius rod at a point intermediate its ends; and a rigid connection between the opposite ends of the torque arms and the respective brake flanges.

CARL J. RHODIN.